(12) United States Patent
Chakhaiyar et al.

(10) Patent No.: US 8,819,302 B2
(45) Date of Patent: Aug. 26, 2014

(54) SYSTEM TO MANAGE INPUT/OUTPUT PERFORMANCE AND/OR DEADLOCK IN NETWORK ATTACHED STORAGE GATEWAY CONNECTED TO A STORAGE AREA NETWORK ENVIRONMENT

(75) Inventors: Madhukar Gunjan Chakhaiyar, Bihar (IN); Mahmoud K. Jibbe, Wichita, KS (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/158,621

(22) Filed: Jun. 13, 2011

(65) Prior Publication Data

US 2012/0317316 A1  Dec. 13, 2012

(51) Int. Cl.
*G06F 3/00* (2006.01)
*G06F 5/00* (2006.01)

(52) U.S. Cl.
USPC ............................ 710/11; 710/15; 710/36

(58) Field of Classification Search
USPC ............................................. 710/11, 15, 36
See application file for complete search history.

(56) References Cited

U.S. PATENT DOCUMENTS

| 5,666,511 | A | 9/1997 | Suganuma et al. | 711/114 |
| 6,457,098 | B1 | 9/2002 | DeKoning et al. | 711/114 |
| 6,629,211 | B2 | 9/2003 | McKnight et al. | 711/141 |
| 7,155,569 | B2 | 12/2006 | Johnson et al. | 711/114 |
| 7,437,727 | B2 | 10/2008 | Leong et al. | 718/104 |
| 7,584,222 | B1 * | 9/2009 | Georgiev | 1/1 |
| 7,650,463 | B2 | 1/2010 | Ahmadian et al. | 711/114 |
| 7,934,055 | B2 | 4/2011 | Flynn et al. | 711/114 |
| 2002/0141427 | A1 * | 10/2002 | McAlpine | 370/413 |
| 2009/0043828 | A1 * | 2/2009 | Shitomi | 707/204 |

* cited by examiner

*Primary Examiner* — Zachary K Huson
(74) *Attorney, Agent, or Firm* — Christopher P. Maiorana, PC

(57) ABSTRACT

An apparatus comprising a first circuit and a second circuit. The first circuit may be configured to generate a plurality of intermediate signals in response to a plurality of input/output requests. The second circuit may be configured to generate a plurality of processed input/output requests in response to the plurality of input/output requests. The processed input/output requests may be configured to be processed by a drive controller to access a drive array in accordance with a protocol used to process the input/output requests.

15 Claims, 10 Drawing Sheets

NAS AND SAN INTEGRATION OVERVIEW

US 8,819,302 B2

SYSTEM TO MANAGE INPUT/OUTPUT PERFORMANCE AND/OR DEADLOCK IN NETWORK ATTACHED STORAGE GATEWAY CONNECTED TO A STORAGE AREA NETWORK ENVIRONMENT

FIELD OF THE INVENTION

The present invention relates to data storage generally and, more particularly, to a method and/or apparatus for managing I/O performance and/or deadlock in network attached storage gateway connected to a SAN environment.

BACKGROUND OF THE INVENTION

Networked Attached Storage (NAS) is useful to provide centralized storage to client computers in environments with large amounts of data. NAS devices use a data storage technology that can be connected directly to a computer network to provide centralized data access and/or storage to heterogeneous network clients. NAS appliances are storage devices that connect directly to the local area network (LAN) via standard Ethernet port and use the TCP/IP protocol to communicate with network peers. TCP/IP works by dividing files into many small fragments, encapsulating the files into packets, and then sending data as frames through the LAN or Wide Area Network (WAN) to a NAS Gateway for further processing.

It would be desirable to implement a system and/or method to manage I/O performance and/or deadlock in a network attached storage gateway connected to a SAN environment.

SUMMERY OF THE INVENTION

The present invention concerns an apparatus comprising a first circuit and a second circuit. The first circuit may be configured to generate a plurality of intermediate signals in response to a plurality of input/output requests. The second circuit may be configured to generate a plurality of processed input/output requests in response to the plurality of input/output requests. The processed input/output requests may be configured to be processed by a drive controller to access a drive array in accordance with a protocol used to process the input/output requests.

The objects, features and advantages of the present invention include providing a method and/or apparatus that may (i) manage I/O performance and/or throughput, (ii) avoid deadlocks by providing exclusive access to a host based on lock management rules and/or priorities, (iii) limit a number of re-tries a single data uses to reduce the load and/or network bandwidth used, (iv) reduce I/O errors by placing less overload on network bandwidth, providing a cutback in data packet loss, retrieving data within TCP/IP network timeout values, (v) optimize the I/O request processing cycle of NAS gateway and/or (vi) be cost effective to implement.

As the number of re-retries and I/O frame deadlock is avoided, the burden over the NAS gateway controller and NAS virtual machine will normally decrease. Faster access to data stored on an array may be provided. I/O performance may also increase. A fewer number of packets damaged and/or lost due to TCP/IP network timeouts may result.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Data center operators and cloud applications continuously strive to improve network attached storage (NAS) performance as the demands of high-throughput applications and/or user bases grow. As the user bases and/or infrastructure grow, heavy amount of I/O transactions often create overload over the NAS gateway. An overload increases the probability of deadlock occurrences and/or creates potential I/O bottleneck situations.

Figure 1:
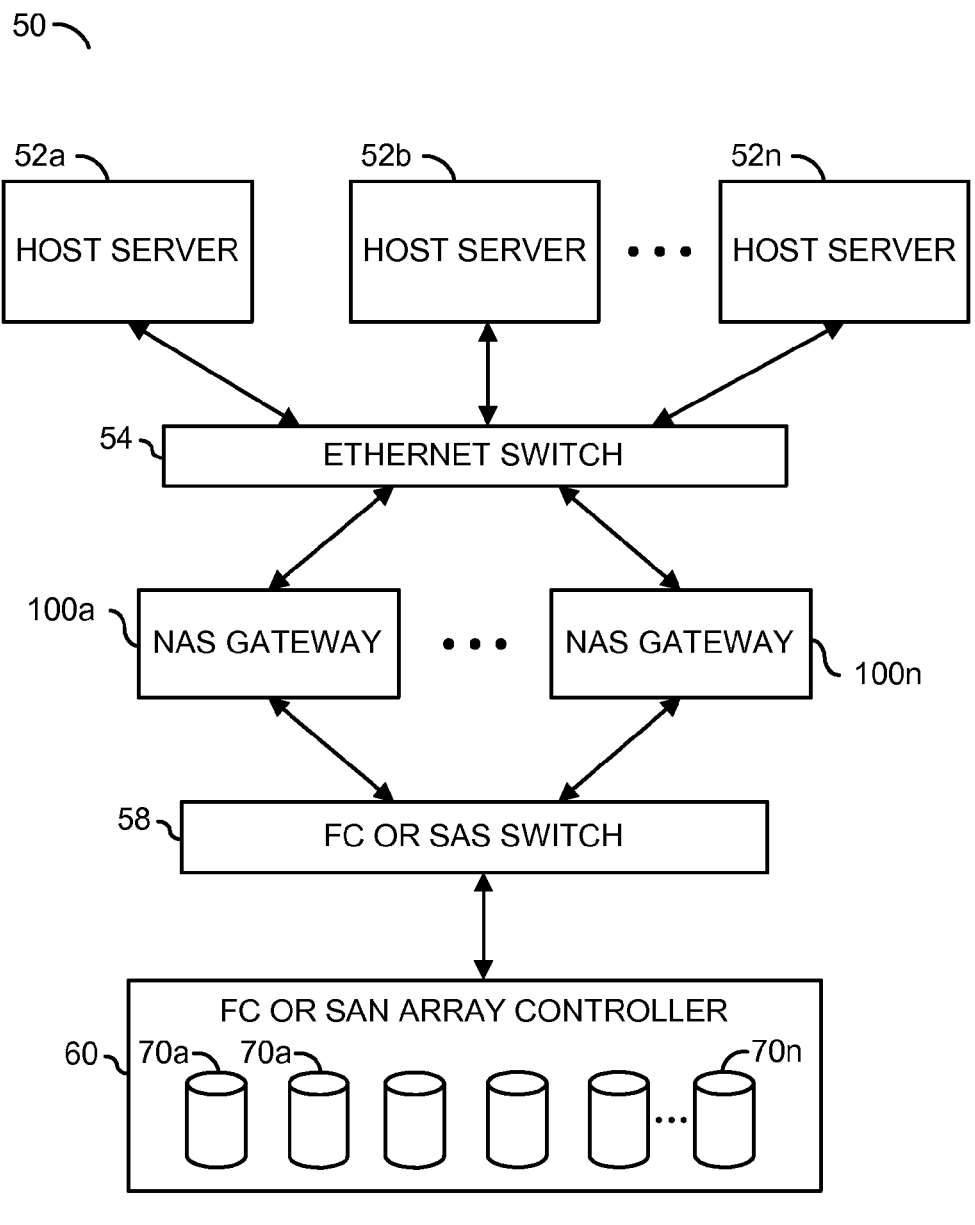
FIG. 1 is a diagram of a system in accordance with the present invention.

Referring to FIG. 1, a block diagram of a system 50 is shown illustrating a context of an embodiment of the present invention. The system 50 generally comprises a number of blocks (or circuits) 52a-52n, a block (or circuit) 54, a number of blocks (or circuits) 100a-100n, a block (or circuit) 58, and a block (or circuit) 60. The circuits 52a-52n may be implemented as a number of host servers. The circuit 54 may be implemented as an Ethernet switch. The circuits 100a-100n may be implemented as one or more NAS gateway circuits. The circuit 58 may be implemented as a switch, such as a fiber channel (FC) or serial attach SCSI (SAS) switch. The circuit 60 may be implemented as a controller circuit, such as a fiber channel controller, or a SAN array controller. The controller 60 may access one or more volumes 70a-70n.

The system 50 may avoid deadlocks, packet loss and/or delay caused by TCP/IP network parameters. The system 50 may reduce the number of re-tries needed to access storage volumes. Management and/or scheduling of I/O request frames may be achieved by using an I/O scheduler engine (to be described in more detail in connection with FIGS. 2 and 3) within one or more of the circuits 100a-100n. The I/O scheduler engine may be used to overcome a deadlock condition that may occur when a parallel read/write is requested from a particular volume. In addition, management of the I/O request frames with data caching may be implemented to avoid deadlocks. Detection of I/O timeouts (based on network parameter), locking of management for I/O (read/write) requests, and/or management of the number of re-tries for access to one of the volumes 70a-70n may also be implemented.

Modern data centers and/or cloud computing environments have an increased I/O performance level to support large-scale applications such as databases, web servers, e-commerce applications, file servers, email, etc. Faster access is difficult to guarantee. As the number of file I/O requests increases with the size of the NAS infrastructure, an increase in latency of data commitment and/or deadlocks (I/O read/write on single volume) also occurs. This results in overhead latency and/or I/O request bottlenecks. NAS performance is heavily dependent on the TCP/IP network. Due to network link parameter (e.g., time to live (TTL)), round trip time (RTT) timeouts may result in packet loss or delay. In certain cases without the invention, data cannot be accessed after several re-tries of a particular read/write request for one or more volumes.

The connectivity of the host servers 52*a*-52*n* to the storage area network (SAN) volumes 70*a*-70*n* may occur through the NAS gateways 100*a*-100*n*. The NAS gateways 100*a*-100*n* may be responsible for a variety of tasks, such as detecting RAID LUNs, creation of file system on RAID LUNs, mounting the file system to a virtual server and providing accessibility of a file system to the host servers 52*a*-52*n*. The NAS gateways 100*a*-100*n* may refer to a NAS device which does not have on-board storage, but instead connects to the SAN controller 60. The NAS gateways 100*a*-100*n* may act as a translator between the file-level NAS protocols (NFS, CIFS, etc.) and the block-level SAN protocols (e.g., Fibre Channel, SAS etc.).

The NAS gateways 100*a*-100*n* may be narrowed by implementing virtualization. For example, a thin software layer (e.g., sometimes known as the hypervisor) may be inserted between the hardware of the servers 52*a*-52*n* and the operating system. Such an abstraction layer may allow each of the physical servers 52*a*-52*n* to run one or more "virtual machines", effectively decoupling the operating system and/or applications from the underlying physical servers 52*a*-52*n*.

Figure 2:
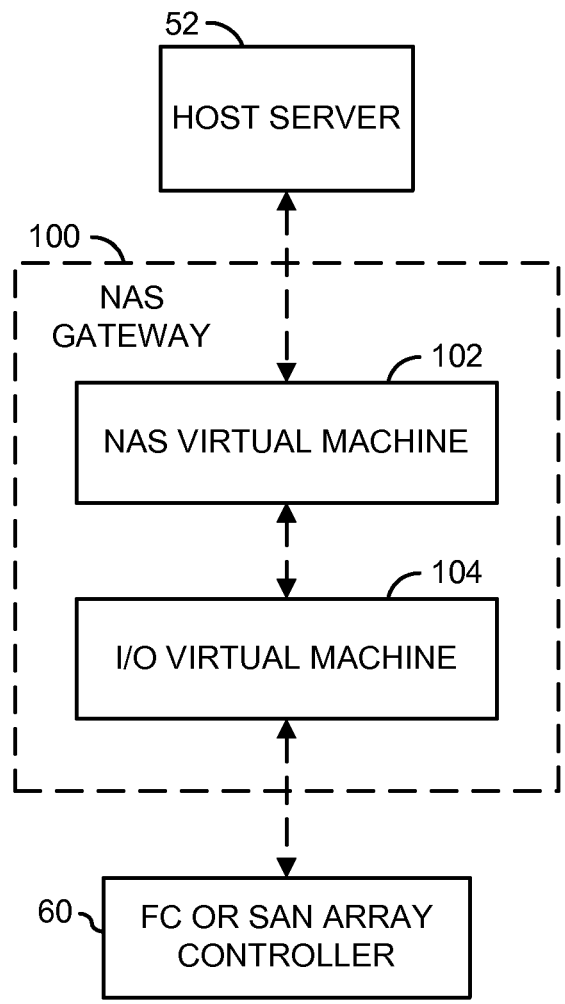
FIG. 2 is a more detailed diagram of an NAS gateway.

Referring to FIG. 2, a diagram illustrating an NAS gateway 100 is shown. The NAS gateway 100 is shown connected between the host server 52 and the controller 60. The NAS gateway 100 generally comprises a block (or circuit) 102 and a block (or circuit) 104. The circuit 102 may be implemented as an NAS virtual machine. The circuit 104 may be implemented as an I/O virtual machine 104. The NAS gateway 100 may create one or more virtual servers.

The NAS virtual machine 102 may be connected to the host server 52 and/or one or more clients. The host server 52 is not concerned that communication is occurring with a gateway instead of directly to a traditional server. As far as NAS communication is concerned, NAS virtual machine 102 operates in the same manner as traditional machines. The virtual machine 102 may accept incoming host server requests, verify users and/or user privileges, share files, store changes, etc. Much like a traditional server, a virtual server may have an independent IP address, one or more mounted storage volumes and/or a name. A virtual machine may also have a volume specifically added before handling I/O requests.

When an I/O request is sent from a client, the request is not sent to a specific NAS gateway 100*a*-100*n*, but rather to a NAS virtual machine 102 within one of the NAS gateways 100*a*-100*n*. The NAS virtual machine 102 may in turn route the I/O request to the I/O virtual machine 104. The I/O virtual machine 104 may process the I/O request and/or direct the request to the controller 60 via host bus adapter and/or input/output controller.

The gateway 100 may be implemented as a part of the NAS virtual machine to connect the NAS virtual machine 102 to the I/O virtual machine 104. The system 50 may overcome a potential deadlock when a parallel read/write is requested from one of the volumes 70*a*-70*n*. In addition, management of data caching may be performed to avoid deadlocks, and/or detection of I/O timeouts (based on network parameter). Lock management for I/O (read/write) requests may be performed to decrease the number of re-tries. In order to reduce retries, an I/O scheduler engine (to be described in more detail in connection with FIG. 3) may manage the incoming I/O requests (e.g., read/write/status). The I/O scheduler engine may contain management logic, cache buffers and channels. The I/O schedule engine may manage (i) transaction and/or timeout detection logic, (ii) query identifier, (iii) I/O route channel, (v) lock management logic, (v) read/write cache buffer, and/or (vi) read and write I/O paths.

Figure 3:
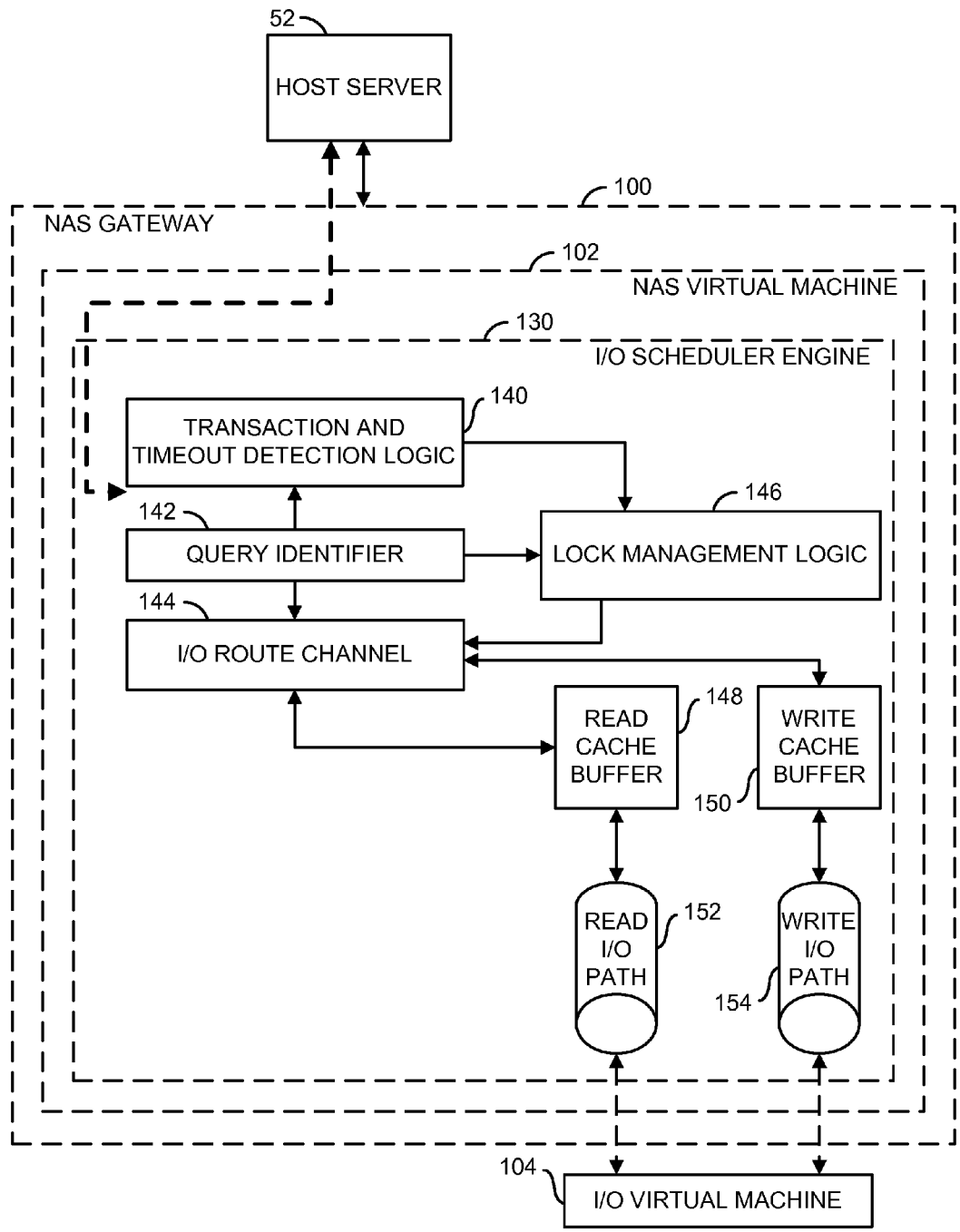
FIG. 3 is a more detailed diagram of an I/O scheduler used with an NAS gateway.

Referring to FIG. 3, a diagram illustrating the connectivity of the host server 52 with the NAS virtual machine 102 is shown. The circuit 102 may include a module (or circuit) 130. The circuit 130 may be implemented as an I/O scheduler engine. The module 130 may be implemented as hardware, software or a combination of hardware and/or software. The I/O scheduler engine circuit 130 generally comprises a block (or circuit) 140, a block (or circuit) 142, a block (or circuit) 144, a block (or circuit) 146, a block (or circuit) 148, a block (or circuit) 150, a block (or circuit) 152, and a block (or circuit) 154. The circuit 140 may be implemented as a transaction and timeout detection logic circuit. The circuit 142 may be implemented as a query identifier circuit. The circuit 144 may be implemented as an I/O route channel circuit. The circuit 140 may be implemented as a lock management logic circuit. The circuit 148 may be implemented as a read cache buffer circuit. The circuit 150 may be implemented as a write cache buffer circuit. The circuit 152 may be implemented as a read I/O path. The circuit 154 may be implemented as a write I/O path.

The query identifier circuit 142 may receive one or more I/O requests from each of the host servers 52*a*-52*n* via the NAS virtual machine 102. The query identifier 142 may include logic to examine one or more I/O request parameters inside the I/O frame. The query identifier 142 may send the information to the transaction and timeout detection logic 140, the lock management logic 146 and/or the I/O route channel 144. The information captured by the query identifier may include:

a) Time to live (TTL). The TTL may limit the time a particular TCP segment may remain on a network. The TTL may be a time measured in seconds. The TTL may also have an attribute of a hop-count. Expiration of the TTL normally causes a frame to be discarded by the NAS gateway 100.

b) Round trip time (RTT). The round trip time may also be called a round-trip delay. The RTT may be a time needed for a frame (or packet) to travel from one of the host servers 52*a*-52*n* to a specific destination (e.g., the NAS gateway 100) and back again. If a delay occurs and the RTT expires, there will be drop of a frame (or packet).

c) Volume access information. The query identifier 142 examines each I/O requests received and determines which of the volumes 70*a*-70*n* the host server 52 is trying to access. The query identifier 142 also identifies the type of access request (e.g., read access, write access or status). The type of access request is in turn transferred to the lock management logic 146, which is used further for lock management.

d) Retry Information. Number of retries to access any particular one of the volumes 70*a*-70*n*. The number of retries are monitored. For example, the number of times a particular I/O request has been sent from the host server 52 to access any particular one of the volumes 70*a*-70*n*. A retry condition occurs when one of the requested volumes 70*a*-70*n* is busy writing other data. The retry information is in turn transferred to the transaction and timeout detection logic 140, which is used further by lock management logic 146.

Figure 4:
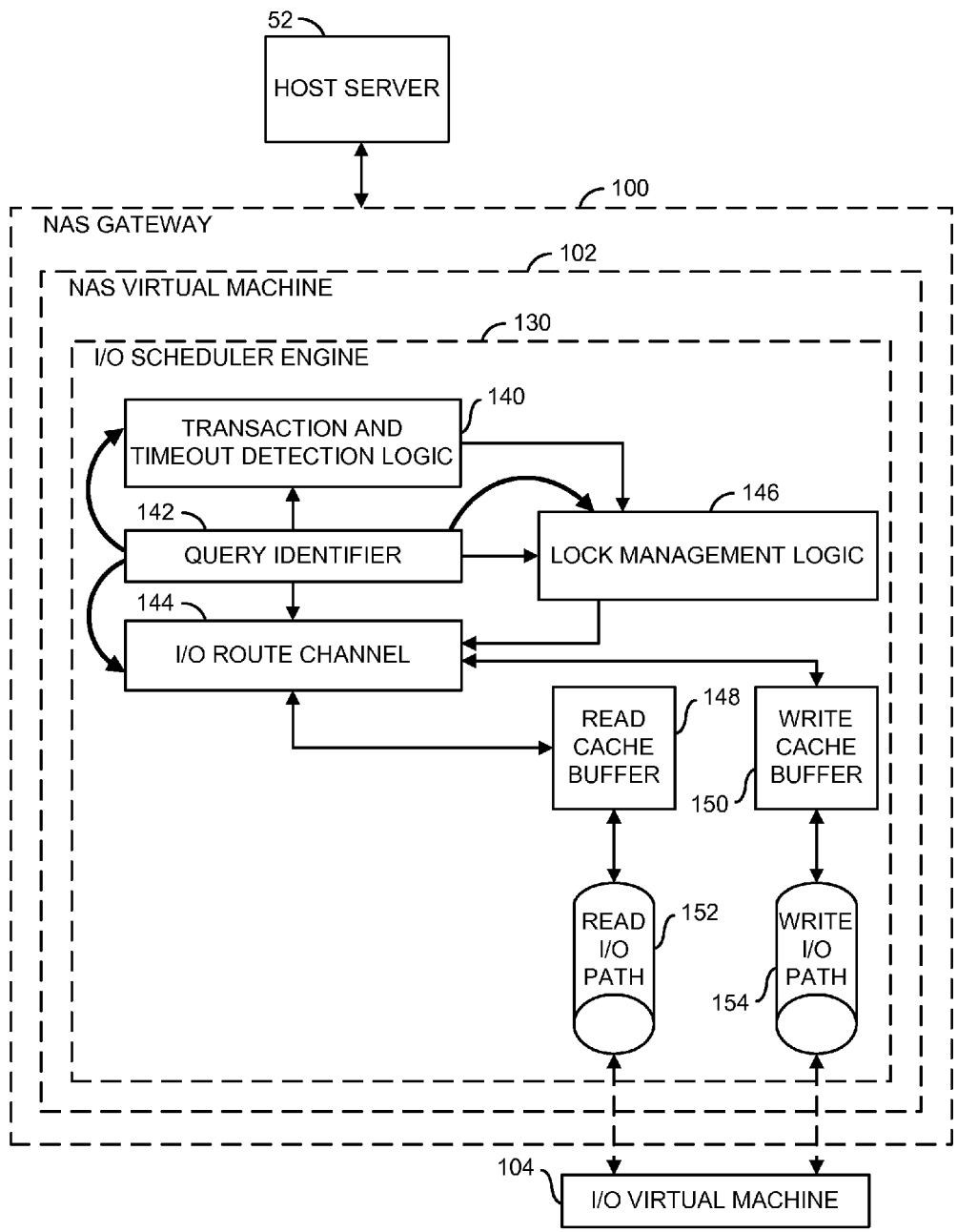
FIG. 4 is a diagram illustrating passing of information to the transaction and timeout detection logic, lock management logic and the I/O route channel.

Referring to FIG. 4, a diagram illustrating how information is passed to the transaction and timeout detection logic 140, the lock management logic 146 and/or the I/O route channel is shown. Once information is retrieved by the query identifier 142, the relevant information is passed on to the transaction and timeout detection logic 148. The logic 140 may monitor the timeouts defined by the query identifier 142 (e.g., TTL, RTT, and number of re-retries to access the volume). Once the I/O frame is received by the query identifier 142, the transaction and timeout detection logic 140 normally starts a countdown of timeout values for each I/O frame. The logic 140 may also check if a defined threshold value as been reached. The threshold value for TTL, RTT, and retry information may be customized to meet the design criteria of a particular implementation and/or design. The threshold value may create a list and/or update an entries of I/O frame(s) based on a timestamp value (e.g., indicating when an I/O frame has been received by the query identifier 142). The following TABLE 1 illustrates an example of a time out detection logic:

TABLE 1

| IO Frame Timestamp value | Time Remaining (TTL) | Time Remaining (RTT) | Is reaching threshold? |
| --- | --- | --- | --- |
| xx.yy | 45 | 51 | No |
| aa.bb | 42 | 59 | Yes |

If the logic 140 determines that a particular I/O frame is reaching the threshold, the logic 140 may send a request to the lock management logic 146 to release the I/O frame for processing before the timeout expires. Otherwise, if the I/O frame has already been processed before reaching the defined threshold value, the logic 140 normally removes the entry from the list for that particular I/O frame.

Figure 5:
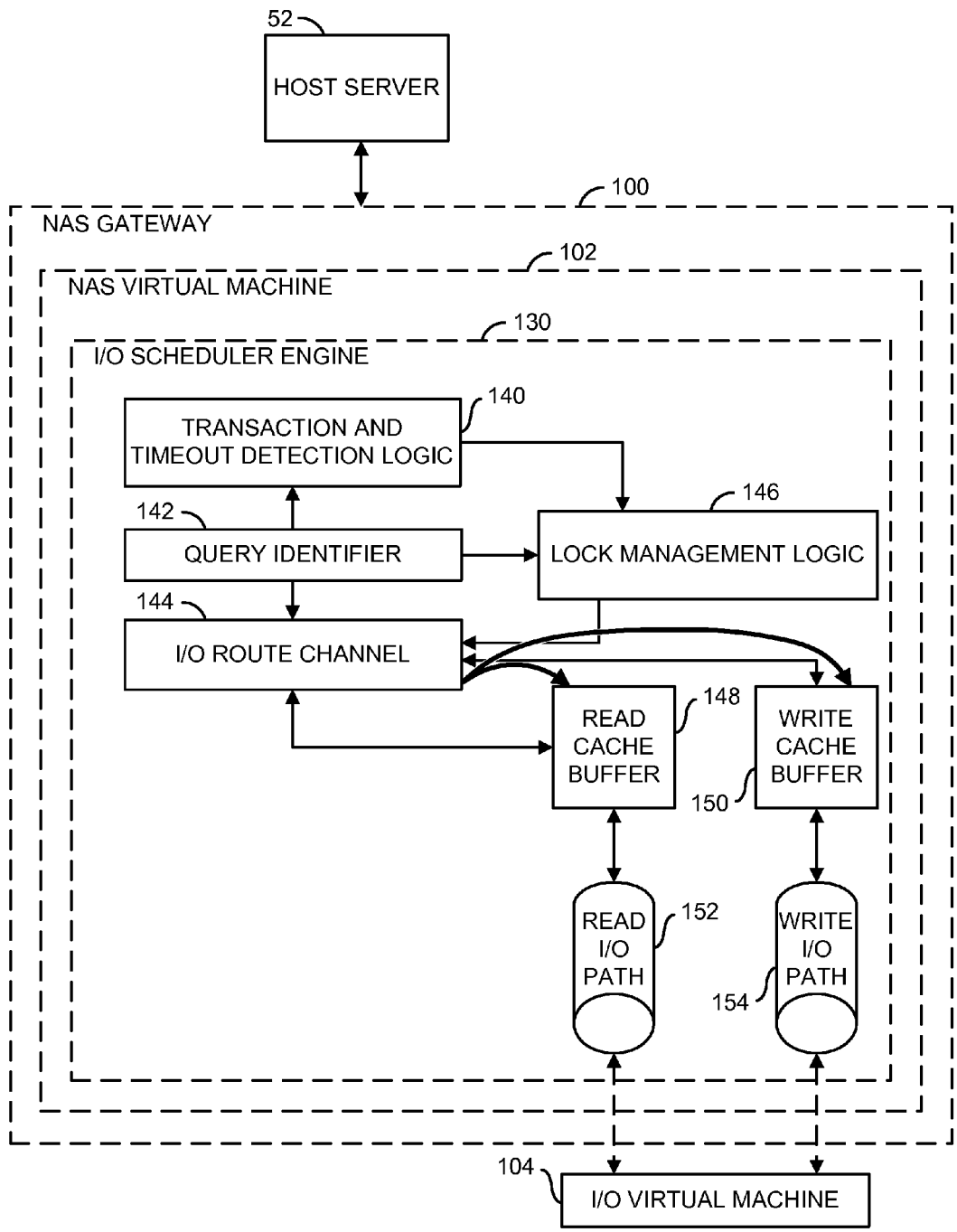
FIG. 5 is a diagram illustrating the placement and routing of I/O frames to respective cache buffers.

Referring to FIG. 5, a diagram illustrating the placement and routing of I/O frame to respective one of cache buffers 148 and/or 150 is shown. The I/O route channel 144 may be configured as a dependent body to respond to instructions received from the lock management logic 146. The channel 144 normally receives the type of I/O frame information (e.g., read I/O request, write I/O request and/or status) from the query identifier 142 and places the I/O request frame in the respective cache buffer (the read cache buffer 148 or the write cache buffer 150). The channel 144 does not normally process or push an I/O request forward. Once the signal is received from the lock management logic 146 to process an I/O frame, the channel 144 routes the I/O frame to the read I/O path 152 or to the write I/O path 154. The path 152 and/or the path 154 are normally connected to the I/O virtual machine 104. The I/O virtual machine 104 may direct the I/O frames to the controller 60 to commit and/or retrieve the data.

The read cache buffer 148 and the write cache buffer 150 may be used to speed up data movement operations by temporarily placing data (or a copy of data) in a location where that may be accessed more rapidly than normal access from SAN hard disk. The read I/O path 152 and the write I/O path 154 may be channels that may be connected to the I/O virtual machine 104. The path 152 and/or the path 154 may separately carry read access frame/data and/or write access frame/data and to be delivered to the I/O virtual machine 104.

The lock management logic 146 may store intelligence of I/O scheduler engine 102. To properly schedule the I/O request frames, the logic 146 may extract information from the query identifier 142 and/or timeout information from the transaction and timeout detection logic 140. The lock management logic 146 may also instruct the I/O route channel 144 to either release the lock over the I/O request frame or hold the lock until a release signal is received from lock management logic 146. Based on inputs from logistics, the logic 140 may create a conditional evaluation table with information of each I/O request frame received. The lock management logic 146 may evaluate the table under one or more predefined rules to generate the write lock signal for write I/O request frame to avoid deadlock. During such a condition, no signal will need to be generated for to lock read I/O request frame, since a read I/O request may be processed through the read cache buffer 148 at any point. For example, a write lock condition does not normally lock read I/O requests.

Figure 6:
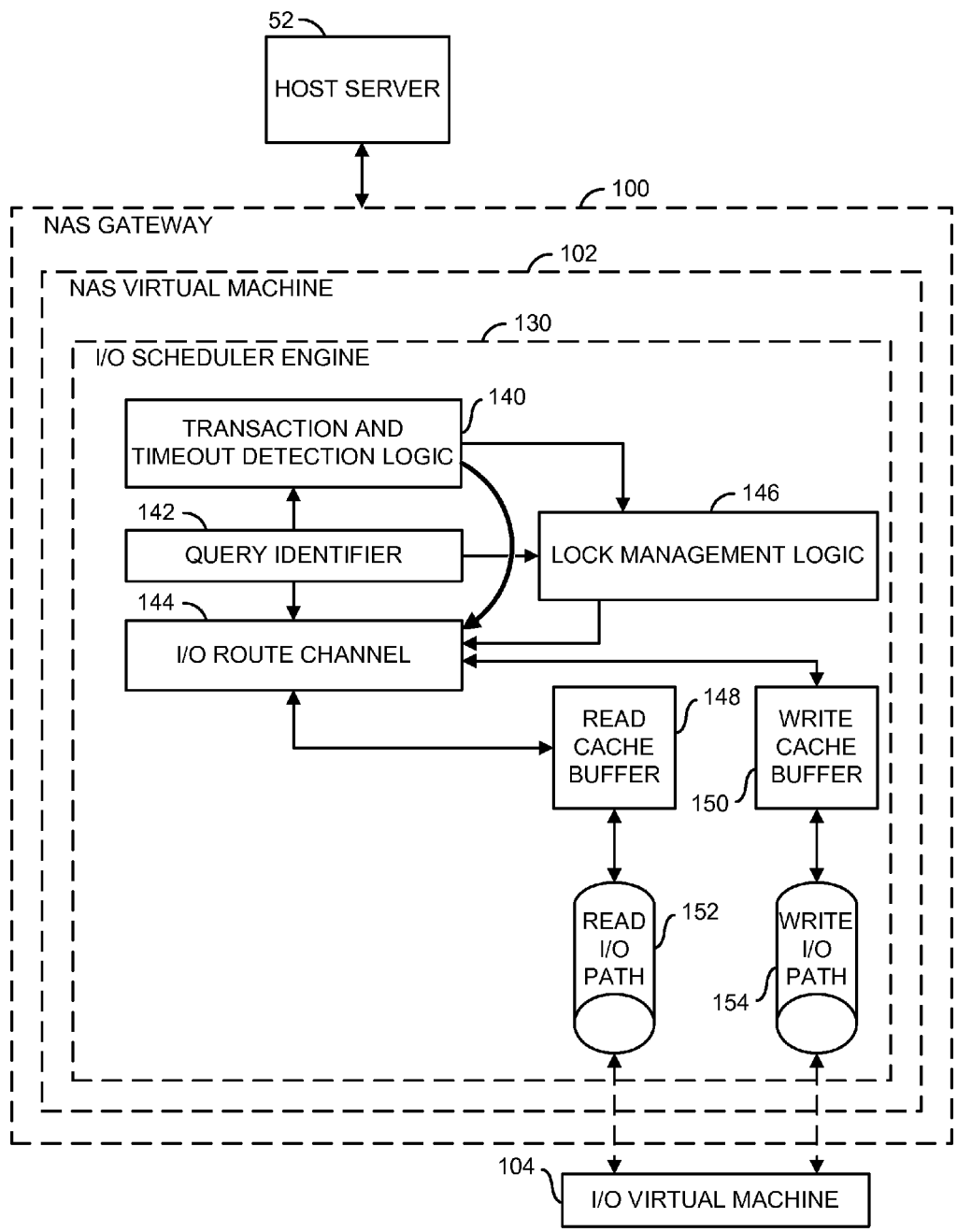
FIG. 6 is a diagram illustrating the information extraction by the lock management logic and instruction execution to the I/O route channel.

Referring to FIG. 6, a diagram illustrating information extraction by the lock management logic 146 and instruction execution to the I/O route channel 144 is shown. The operations and/or rules of the lock management logic 146 are defined based on a number of conditional evaluation tables. Conditional operations may be based on one or more lock management logic rules to avoid a deadlock condition.

Figure 7:
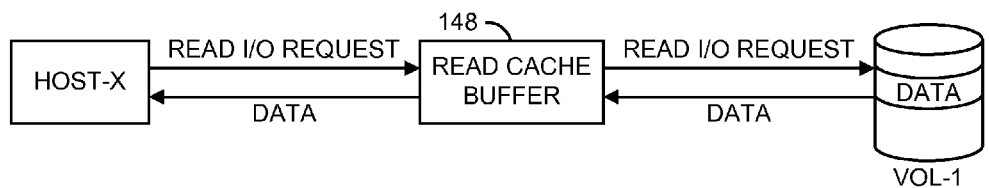
FIG. 7 is a diagram of an I/O request from a single host.

Referring to FIG. 7, a scenario of an I/O request from a single host is shown. An example where the NAS gateway 100 is connected to one active host servers (e.g., host-X), requesting I/O transactions is shown. The host-X may represent one of the hosts 52a-52n. For example, a single volume (e.g., Vol-1, which may be on of the volumes 70a-70n) may be considered, upon which an I/O transaction is complete. The same will be applicable on other volumes 70a-70n as well. The following TABLE 2A illustrates a conditional evaluation table of the volume under consideration:

TABLE 2A

| Accessed Volume | Read Request | Write request | Is crossed Threshold Timeouts | Is crossed no. of re-tries? | Write Locking Signal |
| --- | --- | --- | --- | --- | --- |
| Host-X | Yes | No | No | No | 0 |
| Host-Y | No | No | No | No | 0 |

In such a scenario, the host-x may send a read I/O request frame for the volume Vol-1. The lock management logic 146 may process the I/O request when the request is received. The logic 146 will extract the requested data and store the data in the read cache buffer 148 for processing. Once the requested data is buffered, the I/O route channel 144 will allow the host-x to read the data from read cache buffer 148. No write locking signal will be issued.

Figure 8:
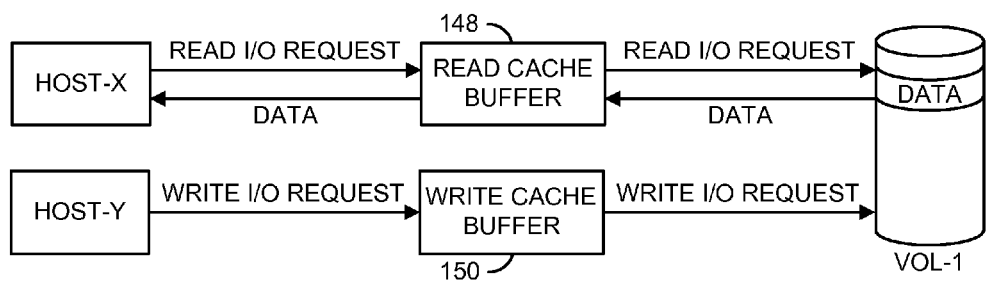
FIG. 8 is a diagram of an I/O request from two hosts.

Referring to FIG. 8, a scenario of two hosts (e.g., a host-x and a host-y) is shown. The following TABLE 2B illustrates conditional evaluation table:

TABLE 2B

| Accessed Volume | Read Request | Write request | Is crossed Threshold Timeouts | Is crossed no. of re-tries? | Write Locking Signal |
| --- | --- | --- | --- | --- | --- |
| Host-X | Yes | No | No | No | 0 |
| Host-Y | No | Yes | No | No | 0 |

The host-x sends a read I/O request frame for the volume Vol-1 and the host-y sends a write I/O request frame for the volume Vol-1. The lock management logic 146 will process the request when the request is received. The logic 146 will extract the requested data to be stored in the read cache buffer 148. Once the requested data is buffered, the I/O route channel 144 will allow the host-x to read the data from read cache buffer 148. In parallel, write I/O requests will be stored with data in the write cache buffer 154. Upon completion of read buffering, the host-y may write the data on the same volume Vol_1. No write locking signal will be issued.

Figure 9:
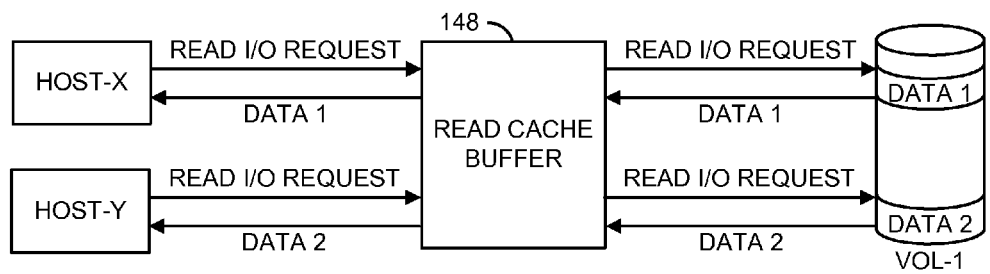
FIG. 9 is a diagram of an I/O request from two hosts.

Referring to FIG. 9, a scenario of two hosts (e.g., a host-x and a host-y) is shown. The following TABLE 2C illustrates conditional evaluation table:

TABLE 2C

| Accessed Volume | Read Request | Write request | Is crossed Threshold Timeouts | Is crossed no. of retries? | Write Locking Signal |
|---|---|---|---|---|---|
| Host-X | Yes | No | No | No | 0 |
| Host-Y | Yes | No | No | No | 0 |

Under this scenario, host-x sends a read I/O request frame for the Vol-1 and host-y also sends a read I/O request frame for the Vol-1. The lock management logic 146 will process the request when the request is received. The logic may first extract the requested data and to be stored in the read cache buffer 148. Once the requested data is buffered, the I/O route channel 144 will allow the host-x and the host-y to read the data from read cache buffer.

Figure 10:
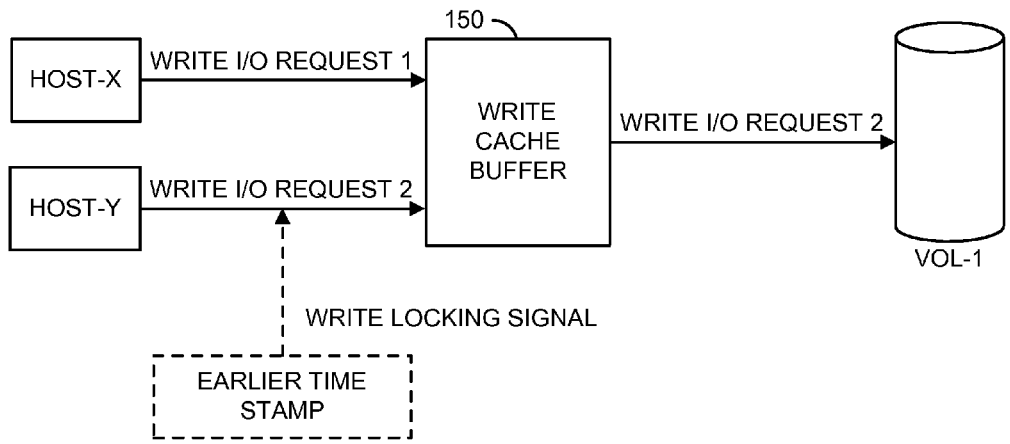
FIG. 10 is a diagram of an I/O request from two hosts.

Referring to FIG. 10, a scenario of two hosts (e.g., a host-x and a host-y) is shown. The following Table 2D illustrates a conditional evaluation table:

TABLE 2D

| Accessed Volume | Read Request | Write request | Is crossed Threshold Timeouts | Is crossed no. of retries? | Write Locking Signal |
|---|---|---|---|---|---|
| Host-X | No | Yes | No | No | 0 |
| Host-Y | No | Yes | No | No | 1 (Based on Timestamp value) |

Under this scenario, the host-x sends a write I/O request frame for the volume Vol-1 and the host-y also sends a write I/O request frame for the volume Vol-1. Since both the write I/O request frame is for the same volume, the lock management logic 146 will allow only one of the I/O requests to process at a time. The query identifier may examine the timestamp of both of the I/O frames to evaluate which I/O request is received first. If the host-y sends the write I/O request earlier than the host-x, the lock management logic 146 will issue the write locking signal for the host-y. The logic 146 may allow the first I/O request received to write to the volume Vol_1 to avoid deadlock.

Figure 11:
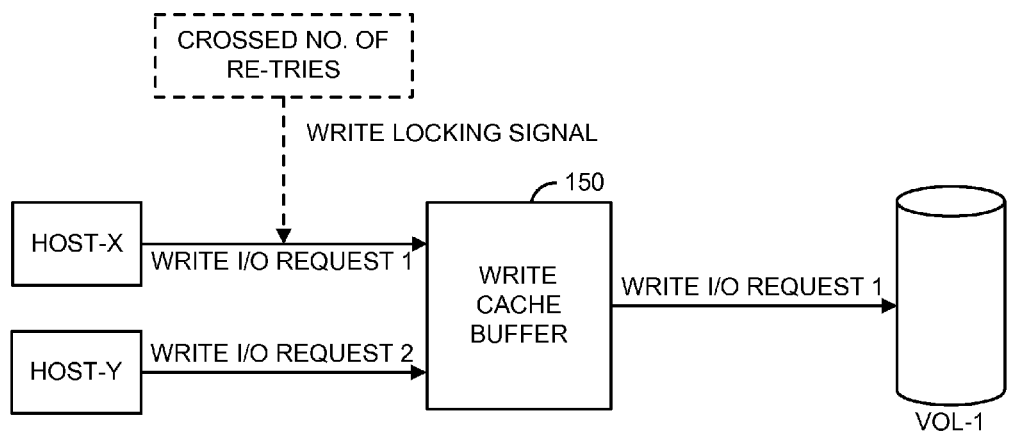
FIG. 11 is a diagram of an I/O request from two hosts.

Referring to FIG. 11, a scenario of two hosts (e.g., a host-x and a host-y) is shown. The following TABLE 2E illustrates a conditional evaluation table:

TABLE 2E

| Accessed Volume | Read Request | Write request | Is crossed Threshold Timeouts | Is crossed no. of retries? | Write Locking Signal |
|---|---|---|---|---|---|
| Host-X | No | Yes | No | Yes | 1 |
| Host-Y | No | Yes | No | No | 0 |

Under this scenario, the host-x sends a write I/O request frame for the volume Vol-1 and the host-y also sends a write I/O request frame for the volume Vol-1. Since both the write I/O request frames are for the same volume, the lock management logic 146 will normally allow only one of the I/O requests to process at a time. The I/O request with priority will be decided before processing either request. The logic 146 will examine if any I/O frame has crossed the number of retries to access the same volume. For example, if the host-x has crossed the number of retries to access the same volume Vol-1, the lock management logic 146 will issue the write locking signal for the write I/O request frame of the host-x. The logic 146 then allows the host-x to write first on the volume to avoid deadlock.

Figure 12:
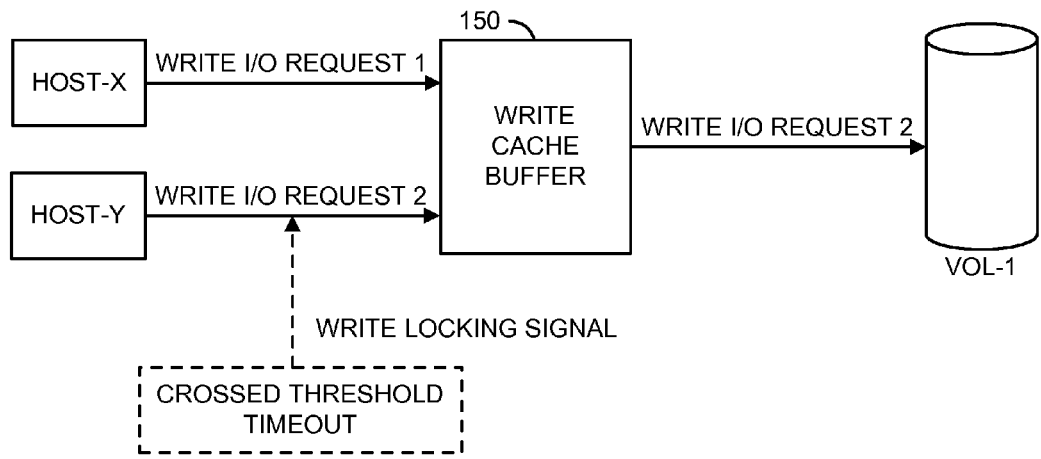
FIG. 12 is a diagram of an I/O request from two hosts.

Referring to FIG. 12, a scenario of two hosts (e.g., a host-x and a host-y) is shown. The following TABLE 2F illustrates a conditional evaluation table:

TABLE 2F

| Accessed Volume | Read Request | Write request | Is crossed Threshold Timeouts | Is crossed no. of retries? | Write Locking Signal |
|---|---|---|---|---|---|
| Host-X | No | Yes | No | No | 0 |
| Host-Y | No | Yes | Yes | No | 1 |

Under this scenario, the host-x sends a write I/O request frame for the volume Vol-1 and the host-y also sends a write I/O request frame for the volume Vol-1. Since both the write I/O request frames are for the same volume, the lock management logic 146 will allow only one of the I/O requests to process at single point of time. To decide before processing the request, the logic 146 will examine if any frame crossed the timeout threshold. For example, if the host-y has crossed the timeout threshold, the lock management logic 146 will issue the write locking signal for the write I/O request frame of the host-y. The logic 146 may allow the host-y to write first on the volume Vol-1 to avoid deadlock.

Figure 13:
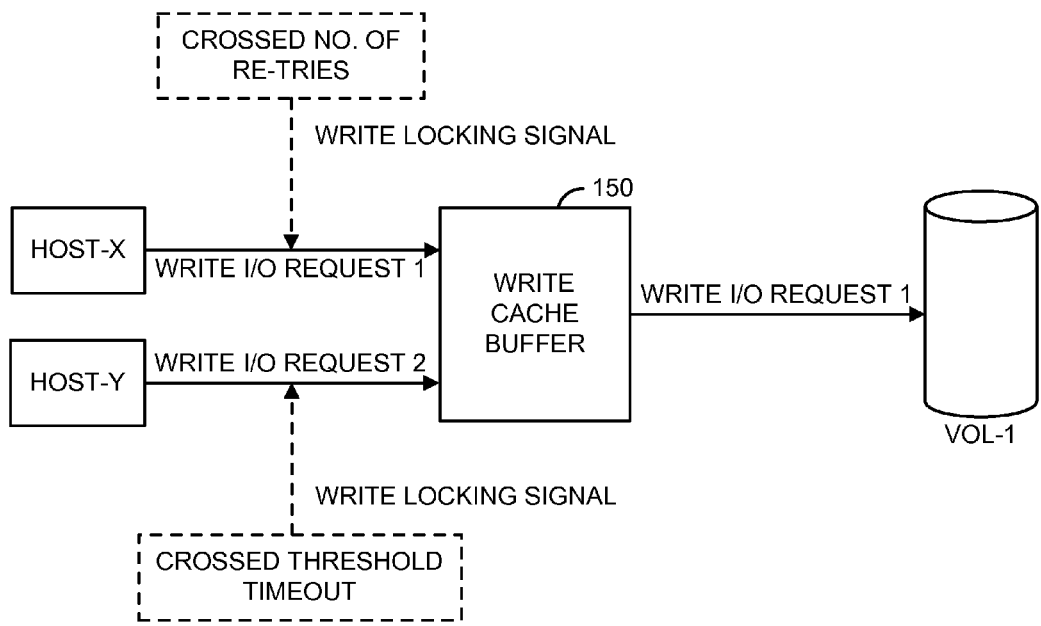
FIG. 13 is a diagram of an I/O request from two hosts.

Referring to FIG. 13, a scenario of two hosts (e.g., a host-x and a host-y) is shown. The following TABLE 2G illustrates a conditional evaluation table:

TABLE 2G

| Accessed Volume | Read Request | Write request | Is crossed Threshold Timeouts | Is crossed no. of retries? | Write Locking Signal |
|---|---|---|---|---|---|
| Host-X | No | Yes | No | Yes | 1 |
| Host-Y | No | Yes | Yes | No | 0 |

Under this scenario, the host-x sends a write I/O request frame for the volume Vol-1 and the host-y also sends a write I/O request frame for the volume Vol-1. Since both the write I/O request frames are for the same volume, the lock management logic 146 will allow only one of the I/O requests to process at a single point of time. To decide before processing the I/O request, the logic 146 will examine if any frame crossed the timeout threshold or the number of retries to access the same volume. For example, if the host-y has crossed the timeout threshold and the host-x has crossed the number of retries to access the same volume Vol-1 as well, the lock management logic 146 will assign high priority to 're-try count' and issue the write locking signal for the write I/O request frame of the host-x. The logic 146 may then allow the host-x allows to write first on the volume Vol-1 to avoid a deadlock.

Figure 14:
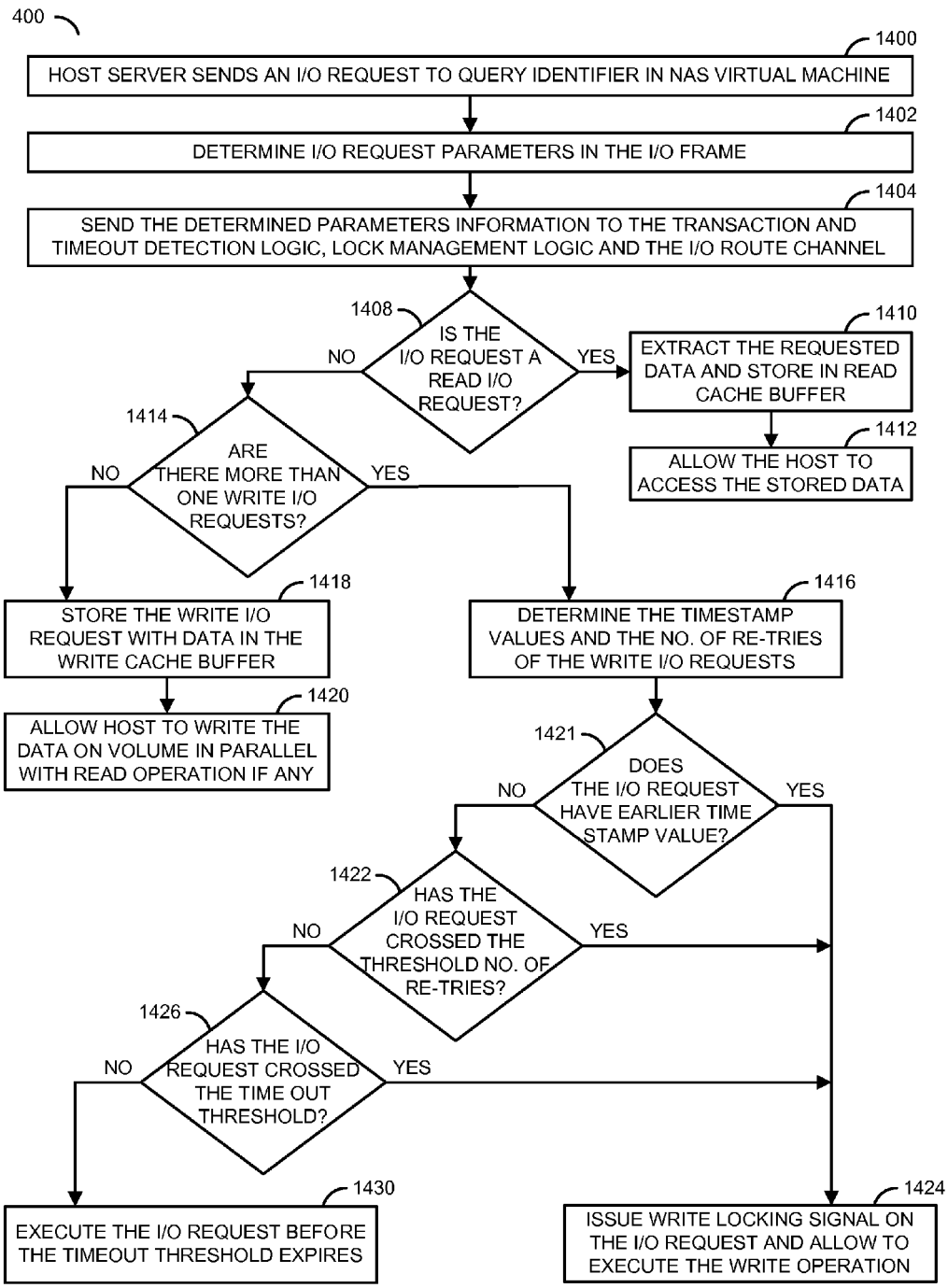
FIG. 14 is a flow diagram illustrating a priority of I/O requests.

Referring to FIG. 14, a flow diagram of a method 400 indicating the conditions based on which I/O requests are executed is shown. In the step 1400, the host server 52 sends an I/O request to the query identifier 142. In the step 1402, the I/O request parameters in the I/O frame is are determined. In the step 1404, the determined parameters are sent to the transaction and timeout detection logic 140, the lock management logic 146 and the I/O route channel 144. In the step 1408, the method 400 determines whether the I/O request is a read I/O request. If yes, the step 1410 extracts the requested data and stores the data in the read cache buffer 148. In the step 1412, the host 52 is allowed to access the stored data. If the step 1408 determines that a read I/O request has not been received, then the step 1414 determines whether there are more than one write I/O request. If not, the step 1418 determines whether the write I/O request along with the data is stored in the write cache buffer 150. Next, the step 1420 allows the host 52 to write data on the volume in parallel with a read operation (if any).

Referring back to the step 1414, if more than one write I/O request is received, then in the step 1416, the time stamp value and the number of re-tries of the write I/O requests are determined. Next, the step 1421 determines whether the I/O request has an earlier time stamp value. If yes, a write locking signal is issued for the I/O request and the write operation is executed at the step 1424. If not, the step 1422 determines whether the I/O request has crossed the threshold number-of re-tries. If yes, then the step 1424 generates a write locking signal issued to the I/O request and a write operation is executed. If not, the step 1426 determines whether the I/O request has crossed the timeout threshold. If yes, then the step 1424 issues a write locking signal to the I/O request and the write operation is executed. If not, the step 1430 executes the I/O request before the time out threshold expires.

The functions performed by the diagram of FIG. 11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a first circuit configured to generate a plurality of intermediate signals in response to a plurality of input/output requests received using a file-level protocol, wherein said first circuit operates as a first virtual machine connected to a network; and
    a second circuit configured to generate a plurality of processed input/output requests using a block-level protocol in response to said plurality of intermediate signals, wherein (A) said second circuit acts as a second virtual machine connected to a drive array and (B) said processed input/output requests are configured to be processed by a drive controller to access said drive array in a redundant arrays of independent disks (RAID) configuration, said drive array configured to respond to said input/output requests in said block-level protocol from said second circuit, and (C) said plurality of processed input/output requests are configured to avoid a deadlock condition when two or more input/output requests are made to said drive controller.

2. The apparatus according to claim 1, wherein said plurality of processed input/output requests include an identifier configured to monitor how long a particular processed input/output request is pending.

3. The apparatus according to claim 1, wherein said plurality of input/output requests are received from a plurality of host computers.

4. The apparatus according to claim 3, wherein said second circuit performs a priority calculation between input/output requests received by a first of said host computers and input/output requests received by a second of said host computers.

5. The apparatus according to claim 4, wherein said apparatus reduces the number of retries when processing said input/output requests.

6. The apparatus according to claim 4, wherein said apparatus reduces the number of packet delays when processing said input/output requests.

7. The apparatus according to claim 4, wherein said apparatus reduces the number of packet losses when processing said input/output requests.

8. The apparatus according to claim 4, wherein said drive array comprises a networked attached storage (NAS) device.

9. The apparatus according to claim 4, wherein said drive array comprises a storage area network (SAS) device.

10. An apparatus comprising:

means for generating a plurality of intermediate signals in response to a plurality of input/output requests received using a file-level protocol operating as a first virtual machine connected to a network; and means for generating a plurality of processed input/output requests received using a block-level protocol in response to said plurality of intermediate signals, wherein (A) said means for generating said processed input/output requests acts as a second virtual machine connected to a drive array and (B) said processed input/output requests are configured to be processed by a drive controller to access said drive array in a redundant arrays of independent disks (RAID) configuration, said drive array configured to respond to said input/output requests in said block-level protocol and (C) said plurality of processed input/output requests are configured to avoid a deadlock condition when two or more input/output requests are made to said drive controller.

11. A method for managing input/output performance in a storage area network, comprising the steps of:

generating a plurality of intermediate signals in response to a plurality of intermediate signals received using a file-level protocol operating as a first virtual machines connected to a network; and generating a plurality of processed input/output requests received using a block-level protocol in response to said plurality of input/output requests, wherein (A) said block-level protocol acts as a second virtual machine connected to a drive array and (B) said processed input/output requests are configured to be processed by a drive controller to access said drive array in a redundant arrays of independent disks (RAID), said drive array configured to respond to said input/output requests in said block-level protocol and (C) said plurality of processed input/output requests are configured to avoid a deadlock condition when two or more input/output requests are made to said drive controller.

12. The apparatus according to claim 4, wherein said priority calculation avoids said deadlock condition between a first of said host computers and a second of said host computers.

13. The apparatus according to claim 1, wherein said plurality of intermediate signals received from said first circuit are used by said second circuit to generate said plurality of processed input/output requests.

14. The apparatus according to claim 1, wherein said apparatus comprises a plurality of said first circuits and a plurality of said second circuits, wherein each of said first circuits accesses said network and each of said second circuits accesses said drive array.

15. The apparatus according to claim 1, wherein said apparatus acts as a translator between the file-level protocol and the block-level protocol.

* * * * *